UNITED STATES PATENT OFFICE.

GEORG ALEFELD, OF DARMSTADT, GERMANY, ASSIGNOR TO LUDWIG ZIEGENBRUCH, OF DARMSTADT, GERMANY.

PREPARATION OF COLORING-MATTERS FOR LUSTER-WARE.

SPECIFICATION forming part of Letters Patent No. 686,695, dated November 19, 1901.

Application filed June 1, 1900. Serial No. 18,771. (No specimens.)

*To all whom it may concern:*

Be it known that I, GEORG ALEFELD, a subject of the Emperor of Germany, and a resident of Darmstadt, Germany, have invented certain new and useful Improvements in the Preparation of Coloring-Matters for Luster-Ware, of which the following is a specification.

In the production of pigments, coloring-matters, or lusters for or on porcelain, glass, enamel, or the like, according to this invention, solutions of boracic-acid-yielding materials are employed, which after having been applied to porcelain, glass, or the like by firing or baking leave behind boracic acid. As boracic-acid-yielding materials all boracic-acid ethers may be employed, whether obtained from boron chlorid and alcohol, from borax with ether sulfate, or in any other manner. For example, they can be conveniently obtained by heating isobutyl alcohol with fused boracic acid. At about 250° centigrade there remains behind a thick or semiliquid residue which will dissolve in or mix with ethereal oils in any proportion. If these boracic solutions be added to pigments or glazes used in producing "luster-ware," either by themselves or in combination with "lusters" of precious metals, borates will form after firing in the place of the metal coatings and will produce their effect upon the metallic oxids or the precious metals, as the case may be.

Lusters may be defined as solutions of metal resinates in ethereal oils, and they have heretofore been used for coating porcelain, glass, or the like with a very fine layer of metal to give color to the material coated. This layer is so fine that the real color of the metal itself is not perceptible, but the surface coated takes on singular, mutable, and shining colors. By preparing these lusters in combination, as above described, very beautiful coloring effects are obtained, which are not produced by simple lusters. Thus cobalt luster combined with the solution containing boracic acid will give a beautiful blue color upon enamel, while solutions containing gold, such as gold luster, will, according to the proportion of pure gold, impart purple, deep red, or rose-pink colors to glass or the like.

I claim—

1. The process herein described of preparing pigments or coloring-matters for glass, enamel or the like, which consists in adding boracic-acid-yielding materials to lusters of the metals.

2. The process herein described of preparing pigments or coloring-matters for glass, enamel or the like, which consists in adding boracic-acid-yielding materials to lusters of the precious metals.

3. The process herein described of preparing pigments or coloring-matters for glass, enamel or the like, which consists in adding boracic-acid ethers to lusters of the metals.

4. The process herein described of preparing pigments or coloring-matters for glass, enamel or the like, which consists in adding boracic-acid ethers to solutions of metal resinates in ethereal oils.

5. The process herein described of preparing pigments or coloring-matters for glass, enamel or the like, which consists in adding a boracic-acid solution to a luster of the precious metals.

6. The process herein described of preparing pigments or coloring-matters for glass, enamel or the like, which consists in adding a boracic-acid solution to gold luster.

In testimony whereof I have signed my name to this specification in the presence of two subscribing witnesses.

GEORG ALEFELD.

Witnesses:
FRANZ HASSLACHER,
MICHAEL VOLK.